(12) United States Patent
Leinen

(10) Patent No.: US 8,844,560 B2
(45) Date of Patent: Sep. 30, 2014

(54) CARTRIDGE HOUSING

(75) Inventor: Josef Leinen, Frankfurt (DE)

(73) Assignee: CeramTec GmbH, Plochingen (DE)

( * ) Notice: Subject to any disclaimer, the term of this patent is extended or adjusted under 35 U.S.C. 154(b) by 1019 days.

(21) Appl. No.: 12/863,269

(22) PCT Filed: Jan. 19, 2009

(86) PCT No.: PCT/EP2009/050549
§ 371 (c)(1),
(2), (4) Date: Oct. 13, 2010

(87) PCT Pub. No.: WO2009/092688
PCT Pub. Date: Jul. 30, 2009

(65) Prior Publication Data
US 2011/0017329 A1 Jan. 27, 2011

(30) Foreign Application Priority Data

Jan. 21, 2008 (DE) .......................... 10 2008 000 109

(51) Int. Cl.
*F16K 15/00* (2006.01)
*F16K 11/078* (2006.01)

(52) U.S. Cl.
CPC .................................. *F16K 11/0787* (2013.01)
USPC .................................. 137/454.2; 137/625.17

(58) Field of Classification Search
CPC ............................. F16K 11/0787; F16K 31/605
USPC ................................ 137/625.17, 625.4, 454.2
See application file for complete search history.

(56) References Cited

U.S. PATENT DOCUMENTS 5,755,261 A * 5/1998 Fukuzawa et al. ........ 137/625.17
7,137,410 B2 * 11/2006 Rosko ....................... 137/625.17

FOREIGN PATENT DOCUMENTS

| DE | 30 00 631 A1 | 7/1981 |
| DE | 89 07 729 U1 | 9/1989 |
| DE | 10 2004 056568 A1 | 5/2006 |
| EP | 0 641 963 A1 | 3/1995 |
| EP | 1 837 568 A1 | 9/2007 |

OTHER PUBLICATIONS

PCT International Search Report issued in corresponding application PCT/EP2009/050549.

* cited by examiner

*Primary Examiner* — Elizabeth Houston
*Assistant Examiner* — P. Macade Nichols
(74) *Attorney, Agent, or Firm* — Fulbright & Jaworski LLP

(57) ABSTRACT

The most strained component of a cartridge is the bush, in which the control lever is mounted, using which the control can is moved. Upon actuation of the control lever to open and close the intakes and drains, the bush and thus also the extension of the housing and the front wall thereof are strained by bending. Upon mixing of the cold and hot water streams, friction forces arise in directions, which are perpendicular to one another, between the bush and the front wall of the housing and in the extension of the housing by rotation of the bush. All of these strains can result in hysteresis in the mixing position and in the position of the control cam during the opening and closing movements because of tolerances and play the opening and closing movements because of tolerances and play between the individual components. To overcome the strain issues, the bush bus has the control lever mounted therein is mounted using a conical face and also conical part of the front wall of the cylindrical housing.

8 Claims, 1 Drawing Sheet ially shaped cartridge. In accor-
CARTRIDGE HOUSING

RELATED APPLICATIONS

This application is a §371 application from PCT/EP2009/050549 filed Jan. 19, 2009, which claims priority from German Patent Application No. 10 2008 000 109.0 filed Jan. 21, 2008, each of which is herein incorporated by reference in its entirety.

FIELD OF THE INVENTION

The invention relates to the housing for a cartridge of a sanitary fitting, wherein the cylindrically shaped housing of the cartridge, which is closed by a base plate, encloses arranged from the bottom to the top: a valve-seat disc with inlet openings for cold and hot water and a discharge opening which runs into the outflow of the sanitary fitting, a control disc which is arranged so that it is displaceable with respect to the valve-seat disc and contains a mixing chamber that connects the inlet openings and the discharge opening of the valve-seat disc and in which the hot water is mixed with the cold water, and also a cover disc which is connected to the control disc on the side thereof that is remote from the valve-seat disc and is effectively connected to a control lever for displacing the discs, wherein the control lever is mounted in a bushing and is moved with the actuating lever of the fitting.

BACKGROUND OF THE INVENTION

High demands are made on a cartridge for a sanitary fitting. It has to remain sealed over a long period of time. It is to be easy to actuate and in the same valve position is, as far as possible, always to deliver water at the same temperature. It has to be able to be produced efficiently and inexpensively, and the number of parts that are subject to wear is to be as low as possible.

The components of a cartridge under strain as a result of wear are the control lever and the components that are connected to and actuated by it, such as the bushing in which it is mounted, and also the control disc that is connected to the cover disc.

In the case of vertical actuation of the actuating lever of the fitting that is connected to the control lever, the inflows are opened or closed; in the case of swiveling in the horizontal direction, the hot-water flow and the cold-water flow are mixed together. When the hot-water flow and the cold-water flow are mixed, the bushing in which the control lever is mounted and to which the control disc is secured by way of the cover disc is rotated in the housing of the cartridge enclosing it.

The bushing as a bearing of the control lever rests against the front wall of the cylindrically shaped cartridge. In accordance with the prior art, as is known, for example, from DE 102004056568 A1, the bushing can have two locating faces on the housing arranged at right angles to each other. The cover disc rests with its side that is remote from the control disc against the front wall of the housing of the cylindrically shaped cartridge and as a result has a horizontal locating face. Since the control lever is arranged outside the housing of the cartridge, the bushing penetrates the housing. The housing as a rule at this point has a vertical extension that encloses the bushing. As a result, the bushing can also have a vertical locating face there on the housing.

The housing of the cartridge has a predetermined height of installation. This is attained when assembling the cartridge, when connecting the housing to the base plate. So that the sealing elements between the individual components can be effective, the housing must be under a certain pre-stress in the axial direction. On account of tolerances and varying flexibility of the sealing elements, these forces can be of differing size for the individual cartridges.

When the control lever is actuated in order to open and close the inlets and outlets, the bushing and, conditional upon this, also the extension of the housing and its front wall are subjected to bending strain. When the cold-water flow and hot-water flow are mixed, as a result of rotating the bushing frictional forces develop in directions that are perpendicular to each other between the bushing and the front wall of the housing and also in the extension of the housing. In particular when the control lever is not mounted in a vertical extension of the housing, play can develop in the horizontal plane with respect to the front wall of the housing. Since the mixing and opening movements of the control lever occur simultaneously as a rule, tensile forces and pressure forces develop at right angles to each other in the housing.

All of these loads can, in a manner conditional on tolerances and play between the individual components, lead to hystereses in the mixing positions and in the position of the control disc during the opening and closing movements. As a result, reproduction of a certain water flow with a certain mixing temperature in a position of the control disc that is approached from opposite sides is not guaranteed. Moreover, there is the risk that the cartridge will become leaky when the sealing elements wear out and harden.

OBJECTS AND SUMMARY OF THE INVENTION

It is therefore the object of the invention to put forward a structurally simple mounting of the bushing with the control lever that is mounted in it in the housing.

The object is achieved with the aid of the invention described herein.

DETAILED DESCRIPTION

In accordance with the invention the bushing with the control lever mounted in it has a conical bearing face that rests against a bearing face with the same angle on the front wall of the housing. Thus an otherwise horizontal and, if applicable, additional vertical bearing face in the housing front wall can be dispensed with. In particular, two bearing faces lead to increased frictional resistance. The forces that act both horizontally and vertically, that is, the forces that act in the transverse and longitudinal direction of the cartridge that would lead to bending forces on horizontal or vertical bearing faces are combined to form one resultant force and only act on one bearing face. With the simultaneous swiveling and tilting movements of the control lever, the introduction of force into the housing is substantially more favourable than in the case of a conventional mounting of the cartridge.

As a result of the conical form, under all loads, both in the case of those that develop during actuation and in the case of those that develop as a result of different pre-tensions in the assembly of the housing, self-centering results in which any play in the mounting is suppressed. As a result, hysteresis during the adjustment of the control disc are prevented, whereby a reproducible through-flow quantity and a reproducible mixing temperature of the water are guaranteed in an identical position of the control lever.

There is a distribution of force that is as uniform as possible when the conical bearing face encloses an angle of 45 angular degrees on the front side of the housing with respect to the conventional bearing face that is perpendicular to the swivel axis of the bushing. The cone angle of the bearing face thus amounts to 90 degrees. For a conical bearing face a cone angle between approximately 80 and 120 angular degrees is advantageous. For angles below or above this, the housing is loaded again increasingly in the radial direction or in the longitudinal direction respectively.

Cartridges should be designed for at least 100000 actuations without signs of wear, in particular leakages. In the case of high-quality fittings a design for 500000 actuations is striven for. The bushing with the control lever mounted in it is the component that is under the most strain. For this reason the choice of materials for the bushing and the housing as the bearing is important. Polyoxymethylene (POM) is to be recommended for the bushing and the housing as sliding partners. A pairing of materials of polyamide and POM is also conceivable. The polyamide can be additionally reinforced by high-strength fibres, for example glass fibres.

In order to reduce the friction between the bushing and the housing as the bearing, there is provision for lubrication with suitable synthetic grease, for example a silicone grease with Teflon particles. The grease is stored in grease chambers that are provided on the bearing faces, on the contact faces of the bushing and the housing moving against each other. The grease chambers are as a rule only provided on one of the bearing faces, either on the bearing faces of the bushing or on the bearing faces of the housing. The grease chambers consist of small depressions. For uniform supply with lubricants it is advantageous if the grease chambers are arranged uniformly on the corresponding bearing face. The grease chambers can be from 1 mm to a few tenths of a millimeter deep and a plurality of millimeters wide and long, for example 5/10 mm deep with an area of 1 mm to 3 mm. A circular cross section with a diameter of a few millimeters, for example 2 mm to 3 mm, is likewise possible.

The invention is explained in greater detail with reference to an exemplary embodiment.

DESCRIPTION OF PREFERRED EMBODIMENTS

Figure 1:
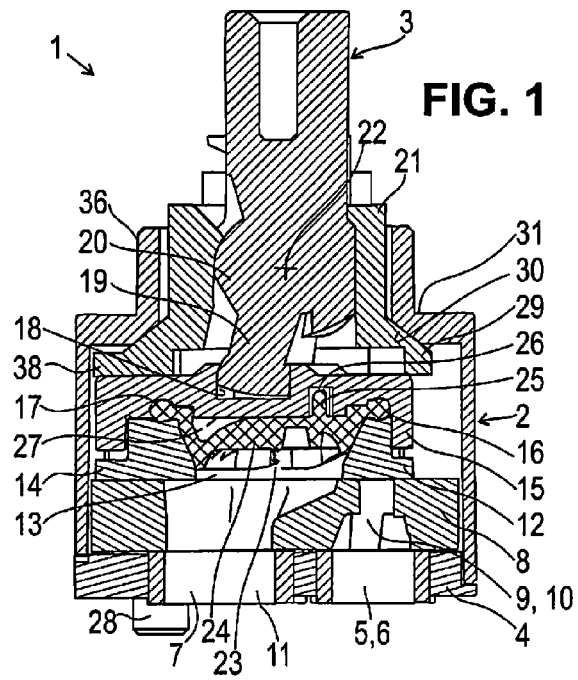
FIG. 1 shows a view of the section through the cartridge in a symmetrical closed position.

In FIG. 1 an aspect of the cartridge 1 is shown in the closed position in section. The housing 2, from which the control lever 3 projects for actuation of the control disc is closed off on the underside by a base plate 4 with the connection openings 5 and 6 for the cold and hot water respectively and with the connection opening 7 for the mixed water flowing off. The section runs centrally through the connection opening 7 for the mixed water that is flowing off and bends off at the central point of the control lever 3 in order from there to run centrally through the connection opening 6 that lies at the back in the viewing direction.

Lying above the base plate 4 there is the valve-seat disc 8 of which the inlet openings 9 and 10 and the discharge opening 11 correspond with the openings 5 and 6 respectively and 7 of the base plate 4.

The control disc 12, here in the closed position, lies above the valve-seat disc 8 in a displaceable manner. It closes the inlet openings 9 and 10. The control disc 12 centrally has a circular break-through 13 into which a body 14 is inserted in order to prevent or dampen the flow noises. In the present exemplary embodiment the body consists of an elastomer. The cover disc 15 lies above this. In order to seal the break-through 13, the body 14 overlaps the control disc 12 with an annular bead 16 as a sealing element that is mounted in a correspondingly shaped groove 17 of the cover disc 15.

The carrier peg 19 of the control lever 3 engages into a groove or depression 18 of the carrier or cover disc 15. The control lever 3 is mounted with a cylindrical swivel bearing 20 in a bushing 21 that is enclosed by the housing 2. The swivel axis 22 is perpendicular to the longitudinal axis of the control lever 3.

The body 14 to prevent or dampen the flow noises fills the break-through 13 of the control disc 12 and arches over the mixing chamber 23 in a hollowly spherical manner. Ribs 24 extending in parallel bring about the damping of noise. The body 14 on its side that is remote from the mixing chamber 23 bears a cross-piece or peg 25 which for centering purposes reaches into a correspondingly shaped groove or depression 26 of the cover disc 15.

In the present embodiment a hollow space 27 that contains an air cushion can be seen above the body 14, between the cover disc 15 and the body 14, here in the region of the discharge opening 11'. As a result of the elasticity of the body 14, when pressure fluctuations occur it is possible for the body 14 to deflect into this space 27 and dampen the pressure surges that occur.

The pegs 28 are used for centering and securement in the fitting.

Figure 2:
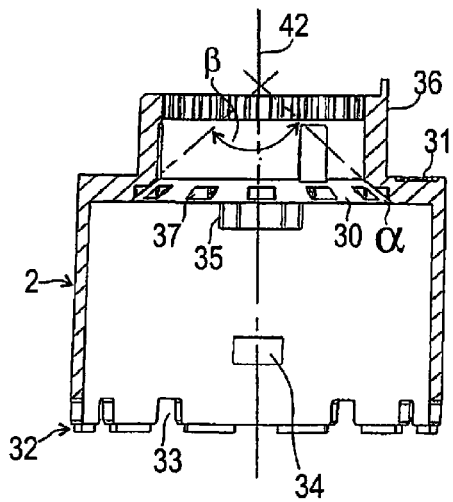
FIG. 2 shows a view of the section through the housing.
Figure 3:
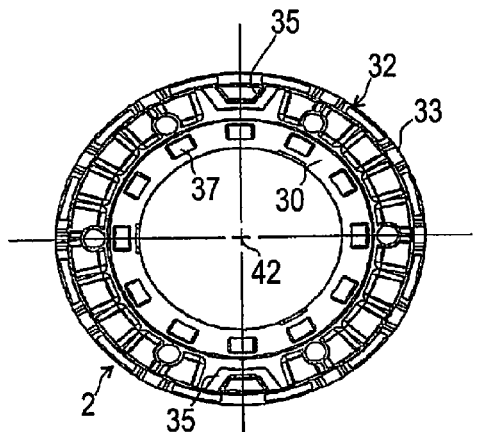
FIG. 3 shows a view of the housing in the direction of the conical bearing face.

A vertical section through the housing 2 is shown in FIG. 2, and an inner view of the housing with a viewing direction of the bearing face 30 is shown in FIG. 3.

The bushing 21 with the control lever 3 mounted in it is stayed in accordance with the invention with a conically shaped face 29 on a likewise conically shaped portion 30 of the cylindrically shaped front wall 31 of the housing 2. This face is used as a bearing face of the bushing 21 during the actuation of the control disc 12 for the mixing of the hot- and cold-water flow.

The bushing 21 can be swiveled about the axis 42 in the housing 2. In the present exemplary embodiment the angle α between the front wall 31 of the housing, which is perpendicular to the axis 42, and the bearing face 29 of the bushing 21 and also the bearing face 30 of the housing 2 amounts to 40 angular degrees (see FIGS. 2 and 4). The cone angle β thus amounts to 100 angular degrees.

The lower edge 32 of the housing 2 has recesses 33 that render possible positionally exact assembly with the base plate 4. Openings 34 serve to hold the barbs—not shown here—of the base plate during assembly. Opposing stops 35 limit the swiveling movement of the bushing 21. The housing 2 has on its front side 31 a cylindrical extension 36 into which the bushing 21 projects with the swivel bearing 20 of the control lever 3.

In order to reduce the friction between the bearing faces, grease chambers 37 are provided either on the bearing face 29 of the bushing 21 or, as provided here, on the bearing face 30 of the housing 2. The size, the shape and the number of grease chambers are determined by the size of the bearing face, by its length and by its width. A distribution of the grease chambers is to be provided on the face Such that a uniform supply of lubricant is guaranteed. The grease chambers can be from 1 mm to a few tenths of a millimeter deep and can have an adapted cross section of a maximum of approximately 2 mm to 3 mm. A round cross section of the grease chambers with a diameter of up to 3 mm is also possible.

Figure 4:
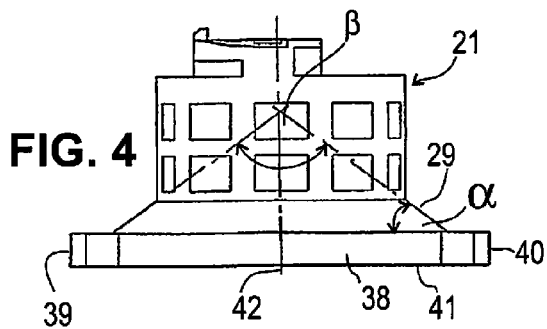
FIG. 4 shows a side view of the bushing.
Figure 5:
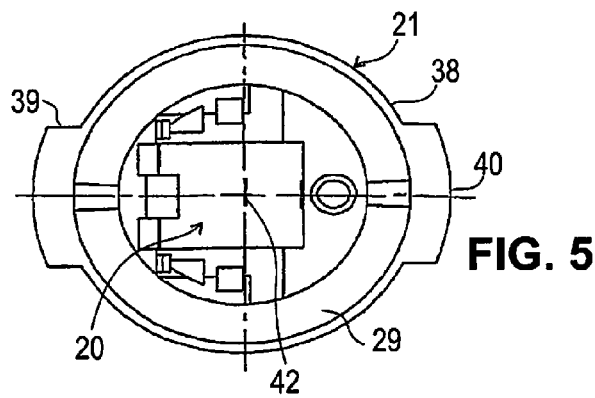
FIG. 5 shows a view of the bushing looking at its upper side.

In FIG. 4 an elevation and in FIG. 5 a plan view of the bushing 21 for mounting the control lever 3 are shown. The bushing 21 can be swiveled about the axis 42. The conical bearing face 29 has an angle α of 40 angular degrees relative to the front side 31 extending perpendicularly to the axis 42 and has no grease chambers. The cone angle β thus amounts to 100 angular degrees. The bushing 21 lies with a flange 38 on the cover disc. Opposing segments 39 and 40 of the flange 38 limit the swivel path of the bushing at the stops 35 of the housing 2. Provided on the underside 41 of the flange 38 there are also grease chambers—not visible here—in order to reduce the friction between the bushing and the cover disc.

In FIG. 5 the swivel bearing 20 into which the control lever is pushed, viewed from below, can be seen in the plan view. In order to reduce the friction between the swivel lever and the bushing, grease chambers—not shown here—can likewise be provided either on the bearing faces of the bushing or on the bearing faces of the swivel lever for lubrication purposes.

It is claimed:

1. A housing for a cartridge of a sanitary fitting, wherein the housing of the cartridge that is closed by a base plate encloses: a valve-seat disc with inlet openings for cold and hot water and a discharge opening which runs into the outflow of the sanitary fitting, a control disc which is arranged so that it is displaceable with respect to the valve-seat disc and contains a mixing chamber that connects the inlet openings and the discharge opening of the valve-seat disc and in which the hot water is mixed with the cold water, and also a cover disc which is connected to the control disc on a side thereof that is away from the valve-seat disc and is effectively connected to a control lever for displacing the discs, the control lever being mounted in a bushing enclosed by the housing and moved with an actuating lever of the fitting, wherein the bushing with the control lever mounted therein is rotatably mounted about an axis extending through the housing with a conically shaped face on a likewise conically shaped portion of the front wall of the housing, wherein a cone angle (β) of a conical form of the bearing face of the bushing and also of a bearing face of the housing lies between 80 and 120 angular degrees, and wherein in order to reduce the friction between the bearing faces at least one grease chamber is provided on the bearing face of the housing.

2. A housing for a cartridge of a sanitary fitting, wherein the housing of the cartridge that is closed by a base plate encloses: a valve-seat disc with inlet openings for cold and hot water and a discharge opening which runs into the outflow of the sanitary fitting, a control disc which is arranged so that it is displaceable with respect to the valve-seat disc and contains a mixing chamber that connects the inlet openings and the discharge opening of the valve-seat disc and in which the hot water is mixed with the cold water, and also a cover disc which is connected to the control disc on a side thereof that is away from the valve-seat disc and is effectively connected to a control lever for displacing the discs, the control lever being mounted in a bushing enclosed by the housing and moved with an actuating lever of the fitting, wherein the bushing with the control lever mounted therein is rotatably mounted about an axis extending through the housing with a conically shaped face on a likewise conically shaped portion of the front wall of the housing, wherein a cone angle (β) of a conical form of a bearing face of the bushing and also of the bearing face of the housing lies between 80 and 120 angular degrees, and wherein in order to reduce the friction between the bearing faces at least one grease chamber is provided on the bearing face of the bushing.

3. A housing for a cartridge of a sanitary fitting, wherein the housing of the cartridge that is closed by a base plate encloses: a valve-seat disc with inlet openings for cold and hot water and a discharge opening which runs into the outflow of the sanitary fitting, a control disc which is arranged so that it is displaceable with respect to the valve-seat disc and contains a mixing chamber that connects the inlet openings and the discharge opening of the valve-seat disc and in which the hot water is mixed with the cold water, and also a cover disc which is connected to the control disc on a side thereof that is away from the valve-seat disc and is effectively connected to a control lever for displacing the discs, the control lever being mounted in a bushing enclosed by the housing and moved with an actuating lever of the fitting, wherein the bushing with the control lever mounted therein is rotatably mounted about an axis extending through the housing with a conically shaped face on a likewise conically shaped portion of the front wall of the housing, wherein a cone angle (β) of a conical form of a bearing face of the bushing and also of the bearing face of the housing amounts to 90 angular degrees, and wherein in order to reduce the friction between the bearing faces at least one grease chamber is provided on the bearing face of the housing.

4. A housing for a cartridge of a sanitary fitting, wherein the housing of the cartridge that is closed by a base plate encloses: a valve-seat disc with inlet openings for cold and hot water and a discharge opening which runs into the outflow of the sanitary fitting, a control disc which is arranged so that it is displaceable with respect to the valve-seat disc and contains a mixing chamber that connects the inlet openings and the discharge opening of the valve-seat disc and in which the hot water is mixed with the cold water, and also a cover disc which is connected to the control disc on a side thereof that is away from the valve-seat disc and is effectively connected to a control lever for displacing the discs, the control lever being mounted in a bushing enclosed by the housing and moved with an actuating lever of the fitting, wherein the bushing with the control lever mounted therein is rotatably mounted about an axis extending through the housing with a conically shaped face on a likewise conically shaped portion of the front wall of the housing, wherein a cone angle (β) of a conical form of a bearing face of the bushing and also of the bearing face of the housing amounts to 90 angular degrees, and wherein in order to reduce the friction between the bearing faces at least one grease chamber is provided on the bearing face of the bushing.

5. A cartridge of a sanitary fitting comprising:
   a cylindrical housing closed by a base plate,
   wherein the cylindrical housing enclosed by the base plate encloses therein:
   a valve-seat disc having inlet openings for cold and hot water and a discharge opening which runs into the outflow of the sanitary fitting;
   a control disc which is arranged so that it is displaceable with respect to the valve-seat disc and contains a mixing chamber that connects the inlet openings and the discharge opening of the valve-seat disc;
   a cover disc which is connected to the control disc on the side thereof that is remote from the valve-seat disc and is effectively connected to a control lever for displacing the discs, the control lever being mounted in a bushing enclosed by the cylindrical housing and moved with an actuating lever of the fitting;

wherein the bushing, with the control lever mounted therein, is rotatably mounted about an axis extending through the cylindrical housing with a conically shaped face on a likewise conically shaped portion of the front wall of the cylindrical housing; wherein a cone angle ($\beta$) of the conical form of a bearing face of the bushing and also of a bearing face of the cylindrical housing lies between 80 and 120 angular degrees, and wherein a grease chamber is provided on the bearing face of the cylindrical housing.

6. A cartridge of a sanitary fitting comprising:

a cylindrical housing closed by a base plate, wherein the cylindrical housing enclosed by the base plate encloses therein:

a valve-seat disc having inlet openings for cold and hot water and a discharge opening which runs into the outflow of the sanitary fitting;

a control disc which is arranged so that it is displaceable with respect to the valve-seat disc and contains a mixing chamber that connects the inlet openings and the discharge opening of the valve-seat disc;

a cover disc which is connected to the control disc on the side thereof that is remote from the valve-seat disc and is effectively connected to a control lever for displacing the discs, the control lever being mounted in a bushing enclosed by the cylindrical housing and moved with an actuating lever of the fitting;

wherein the bushing, with the control lever mounted therein, is rotatably mounted about an axis extending through the cylindrical housing with a conically shaped face on a likewise conically shaped portion of the front wall of the cylindrical housing; wherein a cone angle ($\beta$) of the conical form of a bearing face of the bushing and also of a bearing face of the cylindrical housing lies between 80 and 120 angular degrees, and wherein a grease chamber is provided on the bearing face of the bushing.

7. A cartridge of a sanitary fitting comprising:

a cylindrical housing closed by a base plate, wherein the cylindrical housing enclosed by the base plate encloses therein:

a valve-seat disc having inlet openings for cold and hot water and a discharge opening which runs into the outflow of the sanitary fitting;

a control disc which is arranged so that it is displaceable with respect to the valve-seat disc and contains a mixing chamber that connects the inlet openings and the discharge opening of the valve-seat disc;

a cover disc which is connected to the control disc on the side thereof that is remote from the valve-seat disc and is effectively connected to a control lever for displacing the discs, the control lever being mounted in a bushing enclosed by the cylindrical housing and moved with an actuating lever of the fitting;

wherein the bushing, with the control lever mounted therein, is rotatably mounted about an axis extending through the cylindrical housing with a conically shaped face on a likewise conically shaped portion of the front wall of the cylindrical housing; wherein a cone angle ($\beta$) of the conical form of a bearing face of the bushing and also of a bearing face of the cylindrical housing lies amounts to 90 angular degrees, and wherein a grease chamber is provided on the bearing face of the cylindrical housing.

8. A cartridge of a sanitary fitting comprising:

a cylindrical housing closed by a base plate, wherein the cylindrical housing enclosed by the base plate encloses therein:

a valve-seat disc having inlet openings for cold and hot water and a discharge opening which runs into the outflow of the sanitary fitting;

a control disc which is arranged so that it is displaceable with respect to the valve-seat disc and contains a mixing chamber that connects the inlet openings and the discharge opening of the valve-seat disc;

a cover disc which is connected to the control disc on the side thereof that is remote from the valve-seat disc and is effectively connected to a control lever for displacing the discs, the control lever being mounted in a bushing enclosed by the cylindrical housing and moved with an actuating lever of the fitting;

wherein the bushing, with the control lever mounted therein, is rotatably mounted about an axis extending through the cylindrical housing with a conically shaped face on a likewise conically shaped portion of the front wall of the cylindrical housing; wherein a cone angle ($\beta$) of the conical form of a bearing face of the bushing and also of a bearing face of the cylindrical housing amounts to 90 angular degrees, and wherein a grease chamber is provided on the bearing face of the bushing.

* * * * *